United States Patent
Irie

(10) Patent No.: US 11,808,657 B2
(45) Date of Patent: Nov. 7, 2023

(54) STRESS DISTRIBUTION IMAGE PROCESSING DEVICE

(71) Applicant: Panasonic Intellectual Property Management Co., Ltd., Osaka (JP)

(72) Inventor: Yousuke Irie, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 17/563,627

(22) Filed: Dec. 28, 2021

(65) Prior Publication Data

US 2022/0187162 A1 Jun. 16, 2022

Related U.S. Application Data

(63) Continuation of application No. PCT/JP2020/020767, filed on May 26, 2020.

(30) Foreign Application Priority Data

Jul. 3, 2019 (JP) ................................ 2019-124679

(51) Int. Cl.
G01M 11/08 (2006.01)
G01L 1/24 (2006.01)
G01M 5/00 (2006.01)

(52) U.S. Cl.
CPC .......... G01M 11/081 (2013.01); G01L 1/248 (2013.01); G01M 5/0008 (2013.01)

(58) Field of Classification Search
None
See application file for complete search history.

(56) References Cited

U.S. PATENT DOCUMENTS

| | | | | |
|---|---|---|---|---|
| 2003/0007685 A1* | 1/2003 | Tsai | ........................ | G06T 5/007 |
| | | | | 382/167 |
| 2009/0216123 A1* | 8/2009 | Matsumura | ............ | A61B 8/485 |
| | | | | 600/443 |

(Continued)

FOREIGN PATENT DOCUMENTS

| | | |
|---|---|---|
| EP | 1880679 A1 | 1/2008 |
| JP | H06-201625 A | 7/1994 |

(Continued)

OTHER PUBLICATIONS

International Preliminary Report on Patentability dated Jan. 13, 2022 issued in International Patent Application No. PCT/JP2020/020767, with English translation.

(Continued)

*Primary Examiner* — Raul J Rios Russo
*Assistant Examiner* — Carl F. R. Tchatchouang
(74) *Attorney, Agent, or Firm* — McDermott Will & Emery LLP

(57) ABSTRACT

A stress distribution image processing device including:
a processing unit configured to:
designate a normalization region which includes a portion of stress equal to or larger than a predetermined threshold value in a screen of a stress distribution image of a target object; and
normalize pixels in the normalization region based on stress values in the normalization region to obtain a normalized image.

12 Claims, 22 Drawing Sheets

(56) References Cited

U.S. PATENT DOCUMENTS

| | | | | |
|---|---|---|---|---|
| 2010/0321537 | A1* | 12/2010 | Zamfir | G06T 5/002 |
| | | | | 348/241 |
| 2017/0089689 | A1* | 3/2017 | Boyle | G06T 7/30 |
| 2018/0348064 | A1 | 12/2018 | Irie et al. | |
| 2019/0107448 | A1 | 4/2019 | Irie | |

FOREIGN PATENT DOCUMENTS

| | | |
|---|---|---|
| JP | 2007-163390 A | 6/2007 |
| JP | 2012-221486 A | 11/2012 |
| WO | 2017/141294 A1 | 8/2017 |
| WO | 2018/198702 A1 | 11/2018 |

OTHER PUBLICATIONS

European Office Action issued in corresponding European Patent Application No. 20834544.7 dated Mar. 23, 2023.
Extended European Search Report issued in corresponding European Patent Application No. 20834544.7, dated Jun. 8, 2022.
International Search Report issued in International Patent Application No. PCT/JP2020/020767, dated Sep. 1, 2020; with English translation.

* cited by examiner

STRESS DISTRIBUTION IMAGE PROCESSING DEVICE

CROSS-REFERENCE OF RELATED APPLICATIONS

This application is the U.S. Continuation of International Patent Application No. PCT/JP2020/020767, filed on May 26, 2020, which in turn claims the benefit of Japanese Application No. 2019-124679, filed on Jul. 3, 2019, the entire disclosures of which Applications are incorporated by reference herein.

BACKGROUND

1. Technical Field

The present invention relates to a stress distribution image processing apparatus that normalizes a stress distribution image to obtain a normalized image.

2. Description of the Related Art

Conventionally, in a structure such as a bridge on an expressway, a technique related to a method and a system for measuring a stress distribution generated in the structure by the move of a mobile entity such as a vehicle is known (see, for example, WO 2017/141294).

In the above technique, a stress distribution generated on a bridge or the like is determined based on a temperature change amount due to movement of a mobile entity such as a vehicle.

SUMMARY

However, when conditions such as the size and weight of the vehicle are different, it is not easy to detect a difference in stress distribution due to the difference in conditions even if stress distributions obtained in the respective conditions are compared as they are.

That is, under conditions where measurement conditions, measurement date and time, load weights, and the like are different, there has been a problem that it is not possible to identify an abnormal portion or the like by a simple comparison.

The present disclosure was conceived in view of the situations and it is therefore one non-limiting and exemplary embodiment provides a stress distribution image processing device capable of obtaining an image that can be easily compared even when conditions are different.

In one general aspect, the techniques disclosed here feature: a stress distribution image processing device according to the present disclosure includes:
a processing unit configured to:
designate a normalization region which includes a portion of stress equal to or larger than a predetermined threshold value in a screen of a stress distribution image of a target object; and
normalize pixels in the normalization region based on stress values in the normalization region to obtain a normalized image.

According to the stress distribution image processing device of the present invention, since a normalized image can be obtained by designating a region including a portion of stress equal to or larger than the predetermined threshold value as the normalization region and performing the normalization, it is possible to provide a normalized image that can be compared even under different conditions.

That is, even stress distribution images different in measurement conditions, a measurement date and time, and the like can be compared.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

Figure 1:
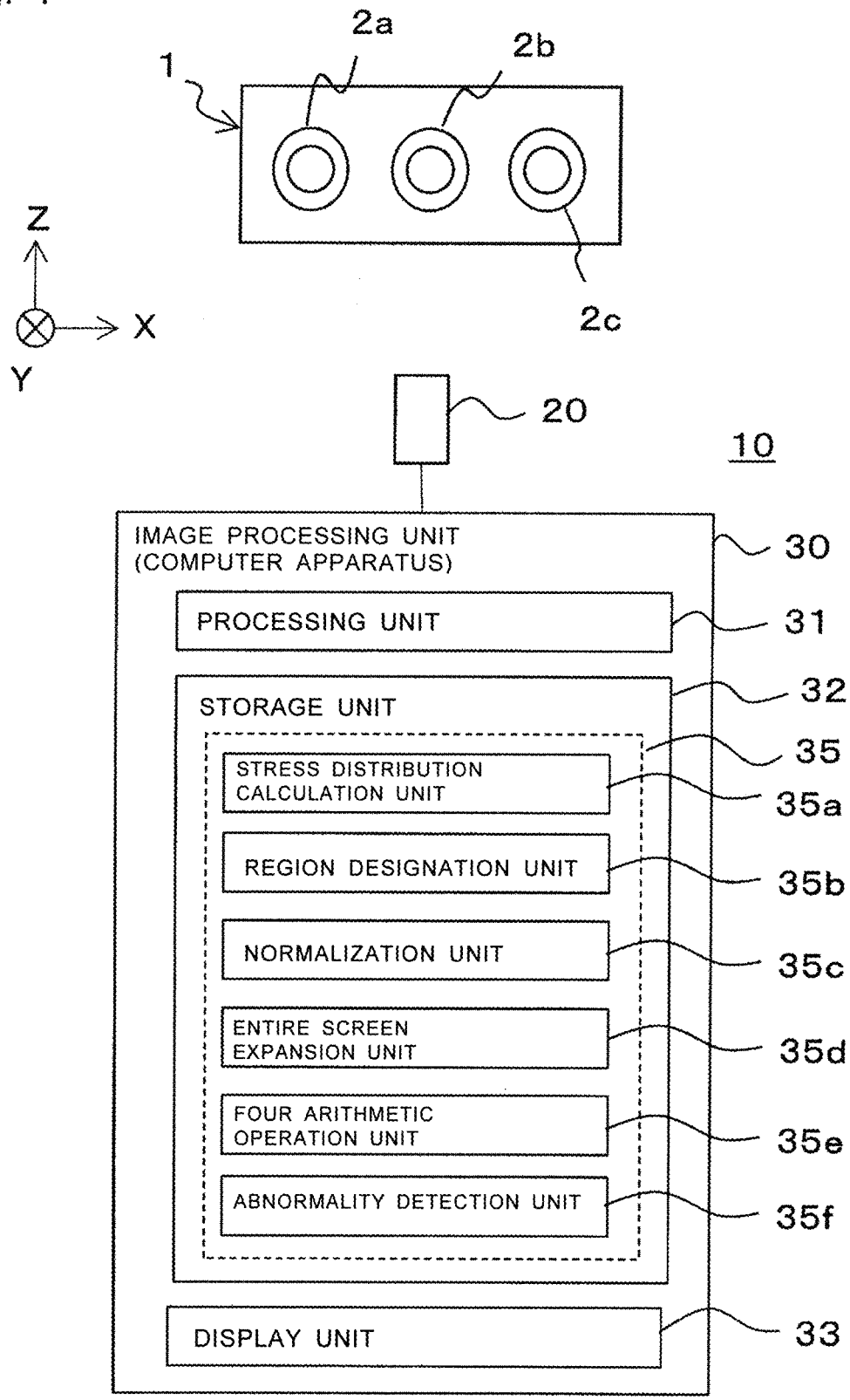
FIG. 1 is a block diagram showing a configuration of a stress distribution image processing device according to a first preferred embodiment.

A stress distribution image processing device according to a first aspect includes:
  a processing unit configured to:
    designate a normalization region which includes a portion of stress equal to or larger than a predetermined threshold value in a screen of a stress distribution image of a target object; and
    normalize pixels in the normalization region based on stress values in the normalization region to obtain a normalized image.

According to the above configuration, since a normalized image can be obtained by designating a region including a portion of stress equal to or larger than the predetermined threshold value as the normalization region and performing the normalization, it is possible to provide a normalized image that can be compared even under different conditions.

In the first aspect, in the stress distribution image processing device according to a second aspect, the processing unit may be configured to normalize all pixels in the normalization region to obtain a normalized image.

In the first aspect, in the stress distribution image processing device according to a third aspect, the processing unit may be configured to set a rectangular range including a portion of stress equal to or larger than the predetermined threshold value as a normalization region.

In the second aspect, in the stress distribution image processing device according to a fourth aspect, the processing unit may be configured to use a normalization method in which a maximum value and a minimum value of stress values in all pixels in the normalization region are set to 1 and 0, respectively.

In the second aspect, in the stress distribution image processing device according to a fifth aspect, the processing unit may be configured to use a normalization method in which, of all pixels in the normalization region, an average is set to 0 and a variance is set to 1.

In the second aspect, the stress distribution image processing device according to a sixth aspect, the processing unit may be configured to perform normalization over an entire screen of the stress distribution image based on a normalization method in the normalization region to obtain a normalized image to function as an entire screen expansion unit.

In the second aspect, the stress distribution image processing device according to a seventh aspect, the processing unit may be configured to perform, with respect to a plurality of normalized images corresponding to a plurality of different conditions for an identical target object, at least one of four arithmetic operations on all pixels in the normalization region between the respective normalized images to obtain a four arithmetic operation processed image to function as a four arithmetic operation unit.

According to the above configuration, the feature amount can be extracted from the obtained four arithmetic operation processed image.

In the seventh aspect, the stress distribution image processing device according to an eighth aspect, the processing unit may be configured to detect an abnormality of the target object based on the four arithmetic operation processed image to function as an abnormality detection unit.

Hereinafter, a stress distribution image processing device according to a preferred embodiment will be described with reference to the accompanying drawings.

It should be noted that in the drawings, substantially the same members are denoted by the same reference numerals.
(First Preferred Embodiment)
<Stress Distribution Image Processing Device>

FIG. 1 is a block diagram showing a configuration of a stress distribution image processing device 10 according to a first preferred embodiment.

The stress distribution image processing device 10 according to the first preferred embodiment includes a region designation unit 35b that designates a normalization region for performing normalization, and a normalization unit 35c that obtains a normalized image. The region designation unit 35b designates, as a normalization region, a region including a portion of a stress equal to or more than a predetermined threshold value in the entire screen of the stress distribution image of the target object. In addition, the normalization unit 35c normalizes all the pixels in the normalization region based on the stress values in all the pixels in the normalization region to obtain a normalized image. It should be noted that the stress distribution image processing device 10 may include an infrared camera 20 that captures an infrared image of the target object 1 and an image processing unit 30 that performs image processing on the stress distribution image. The image processing unit 30 may include a region designation unit 35b and a normalization unit 35c. In addition, for example, a predetermined vibration may be applied to the target object 1 from a vibrator (not shown) connected by bolts 2a, 2b, and 2c.

The stress distribution image processing device 10 can provide a normalized image that can be compared even under different conditions.

Hereinafter, each member constituting the stress distribution image processing device 10 will be described.
<Image Processing Unit (Computer Apparatus)>

The image processing unit 30 performs image processing on the stress distribution image. The image processing unit 30 is, for example, a computer apparatus. As the computer apparatus, a general-purpose computer device can be used, and for example, as shown in FIG. 1, a processing unit 31, a storage unit 32, and a display unit 33 are included. It should be noted that an input device, a storage device, an interface, and the like may be further included.
<Processing Unit>

The processing unit 31 has only to be, for example, a central processing operator (CPU, MPU, or the like), a microcomputer, or a processing device capable of executing a computer-executable instruction.
<Storage Unit>

The storage unit 32 may be, for example, at least one of a ROM, an EEPROM, a RAM, a flash SSD, a hard disk, a USB memory, a magnetic disk, an optical disc, a magneto-optical disk, and the like.

The storage unit 32 includes a program 35. It should be noted that when the image processing unit 30 is connected to a network, the program 35 may be downloaded from the network as necessary.
<Program>

The program 35 includes a region designation unit 35b and a normalization unit 35c. It should be noted that if necessary, a stress distribution calculation unit 35a, an entire screen expansion unit 35d, a four arithmetic operation unit 35e, and an abnormality detection unit 35f may be included. The stress distribution calculation unit 35a, the region designation unit 35b, the normalization unit 35c, the entire screen expansion unit 35d, the four arithmetic operation unit 35e, and the abnormality detection unit 35f are read from the storage unit 32 and executed by the processing unit 31 at the time of execution.
<Stress Distribution Calculation Unit>

The processing unit 31 is configured to obtain a stress distribution image based on a plurality of infrared images at different times to function as a stress distribution calculation unit 35a. That is, the stress change amount is obtained based on the temperature change amount between the plurality of infrared images at different times. An image that has a stress change amount for all pixels is a stress distribution image. It should be noted that when the stress distribution image is provided in advance, it is not necessary to provide this stress distribution calculation unit.

It should be noted that the stress distribution calculation unit 35a can calculate the stress change amount $\Delta\delta$ from the temperature change amount $\Delta T$ by using, for example, the following formula (1) representing a thermoelastic effect.

$$\Delta T = -KT\Delta\delta \tag{1}$$

where, K is a thermoelastic coefficient, $K=\alpha/(\rho Cp)$, and T is an absolute temperature of a surface of a train being a moving body. The $\alpha$ is a linear expansion coefficient of the surface of the target object, $\rho$ is the density of the surface of the target object, and Cp is the specific heat of the surface of the target object under constant stress.

Then, the stress distribution calculation unit 35a can determine the stress distribution of each portion based on the stress change amounts of all the pixels.
<Region Designation Unit>

Figure 2:
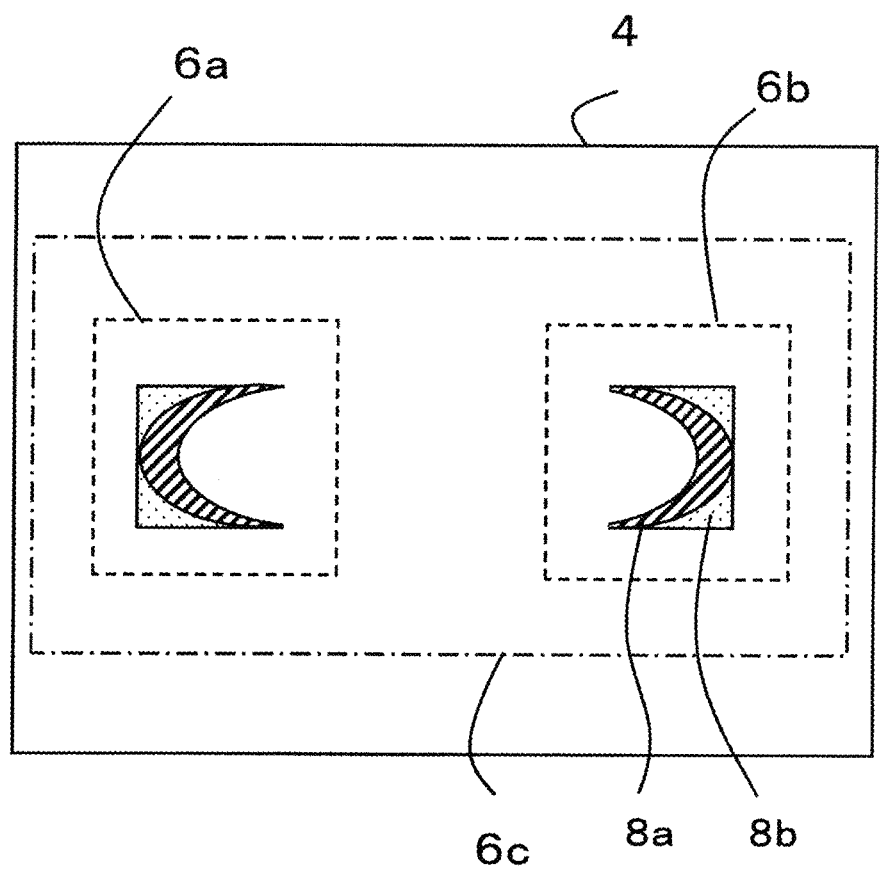
FIG. 2 is a diagram showing a stress distribution image and some examples of normalization regions.

FIG. 2 is a diagram showing a stress distribution image 4 and some examples of normalization regions 6a, 6b, and 6c.

The processing unit 31 is configured to designate, as normalization regions 6a, 6b, and 6c for performing normalization, regions including portions of stress equal to or greater than a predetermined threshold value in the entire screen of the stress distribution image 4 of the target object to function as a region designation unit 35b. For example, in the example in FIG. 2, it can be seen that the periphery of the bolts 2a and 2c of the target object 1 in FIG. 1 has a region 8a having a particularly large stress value. That is, a rectangular range including the region 8a having a large stress value equal to or larger than a predetermined threshold value may be set as the normalization region. Specifically, rectangular regions including the periphery of the bolt 2a and the bolt 2c can be designated as the normalization regions 6a and 6b. In addition, a larger rectangular region including these normalization regions 6a and 6b may be designated as the normalization region 6c. It should be noted that since normalization needs to include not only the region 8a having a large stress but also the region 8b having a small stress value, the normalization region may be designated to include a certain range. Thus, designating the normalization region by the region designation unit 35b allows the influence of noise or the like included in the case of the entire screen to be avoided. In addition, a region including a range desired to be observed may be set as the normalization region. Furthermore, when, in the stress distribution, the compressive stress is set to be in the positive direction and the tensile stress is set to be in the negative direction, the characteristic of the stress distribution can be further grasped by designating the normalization region with the threshold value. That is, when both the positive direction and the negative direction are included, the characteristic of the stress distribution is less likely to be understood, but limiting to only one direction allows the scale to be widened and the characteristic to be easily understood.

It should be noted that when there is no noise or the like in the stress distribution image 4 and the scale is appropriate, the entire screen may be designated as the normalization region.

<Normalization Unit>

Figure 3A:
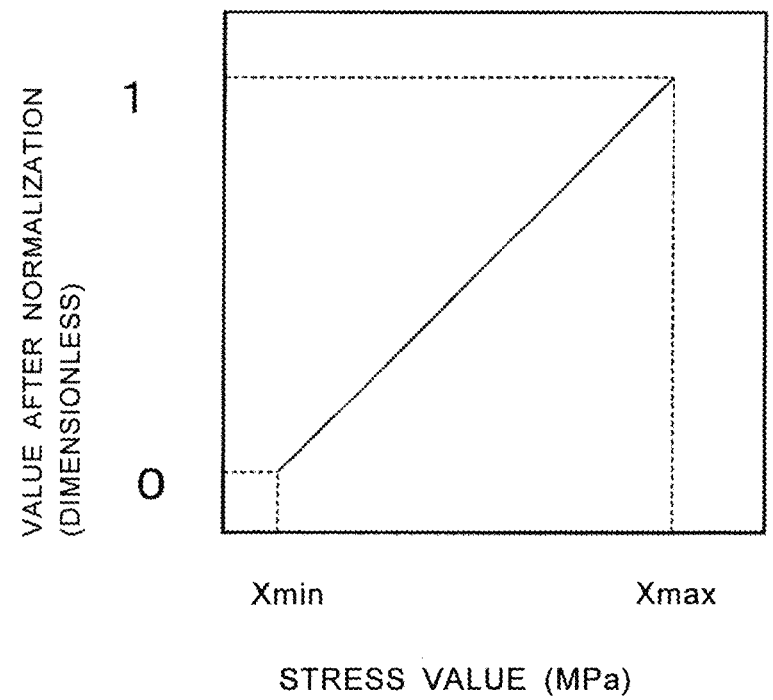
FIG. 3A is a diagram showing a relationship between numerical values before and after normalization in a case of a normalization method in which a minimum value is 0 and a maximum value is 1.

The processing unit is configured to normalize all the pixels in the normalization region on the basis of the stress values in all the pixels in the designated normalization region to obtain a normalized image to function as a normalization unit 35c. The normalization in this case may be, for example, any one of the following.

a) A normalization method including: performing normalization so that a maximum value of stress values of all pixels in a normalization region corresponds to 1 and a minimum value thereof corresponds to 0; and representing the stress value of each pixel as a change amount between 1 and 0. FIG. 3A is a diagram showing a relationship between numerical values before and after normalization in a case of a normalization method in which a minimum value is 0 and a maximum value is 1.

Figure 3B:
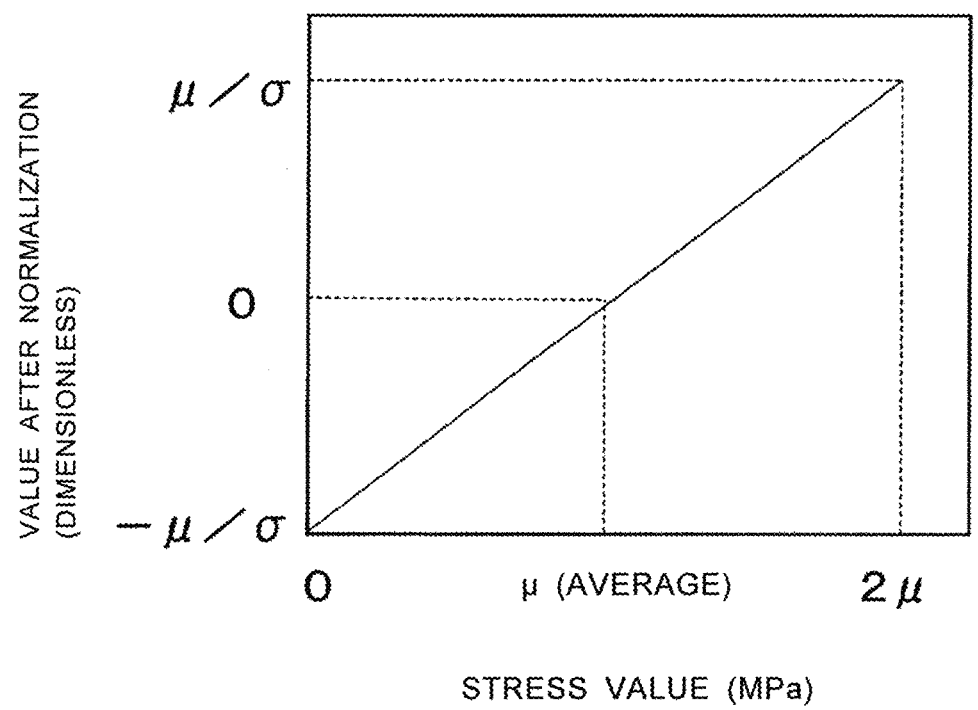
FIG. 3B is a diagram showing a relationship between numerical values before and after normalization in the case of the normalization method in which the average is 0 and the variance is 1.

Specifically, when a stress value before normalization is denoted as X, a maximum value thereof is denoted as Xmax, a minimum value thereof is denoted as Xmin, and a value after normalization is denoted as Y, normalization can be performed by the following formula.

$$Y=(X-X\text{min})/(X\text{max}-X\text{min})$$

b) A normalization method of causing stress values of respective pixels to correspond so that an average of stress values of the respective pixels is 0 and a variance of the stress values of the respective pixels is 1. FIG. 3B is a diagram showing a relationship between numerical values before and after normalization in the case of the normalization method in which the average is 0 and the variance is 1.

Figure 5A:
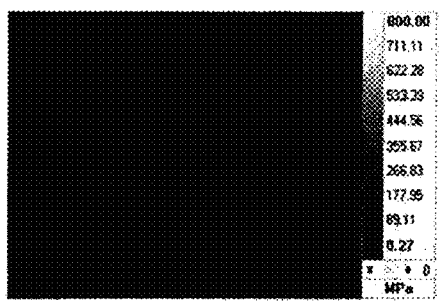
FIG. 5A is a stress distribution image before normalization when the excitation width to the target object is 0.50 mm.
Figure 5B:
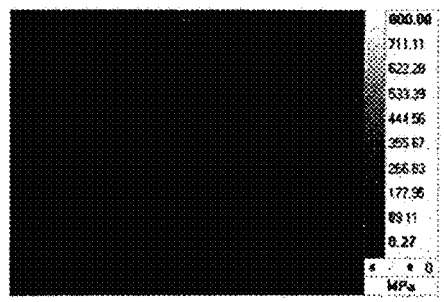
FIG. 5B is a stress distribution image before normalization when the excitation width to the target object is 0.75 mm.
Figure 5C:
FIG. 5C is a stress distribution image before normalization when the excitation width to the target object is 1.25 mm.
Figure 5D:
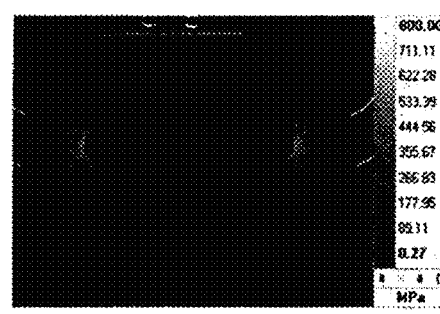
FIG. 5D is a stress distribution image before normalization when the excitation width to the target object is 1.50 mm.
Figure 5E:
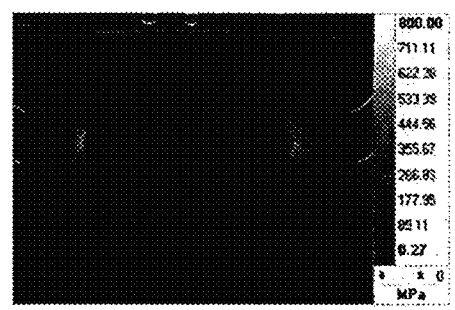
FIG. 5E is a stress distribution image before normalization when the excitation width to the target object is 1.75 mm.
Figure 5F:
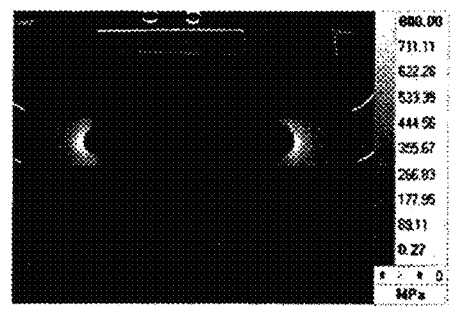
FIG. 5F is a stress distribution image before normalization when the excitation width to the target object is 2.00 mm.
Figure 5G:
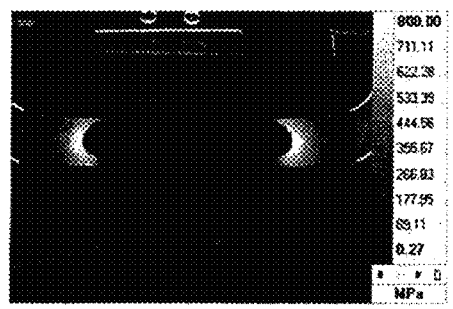
FIG. 5G is a stress distribution image before normalization when the excitation width to the target object is 2.25 mm.
Figure 5H:
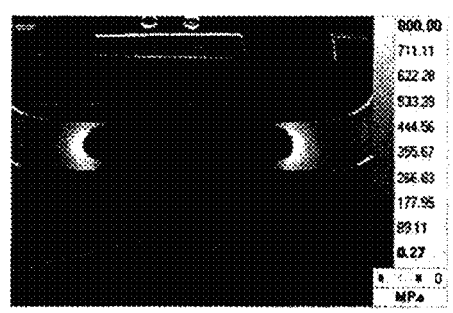
FIG. 5H is a stress distribution image before normalization when the excitation width to the target object is 2.50 mm.
Figure 5I:
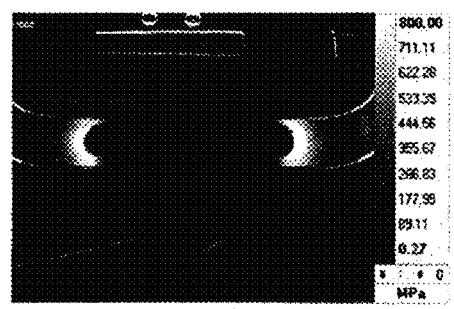
FIG. 5I is a stress distribution image before normalization when the excitation width to the target object is 2.75 mm.
Figure 5J:
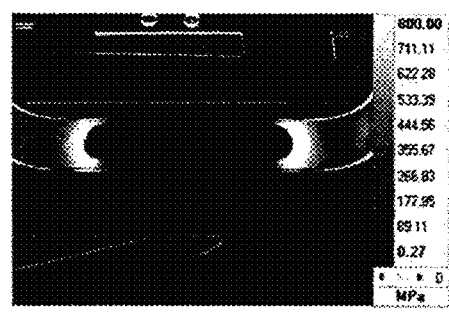
FIG. 5J is a stress distribution image before normalization when the excitation width to the target object is 3.00 mm.
Figure 6A:
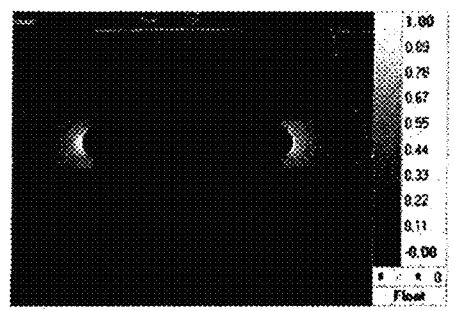
FIG. 6A is a normalized image after normalization when the excitation width to the target object is 0.50 mm.
Figure 6B:
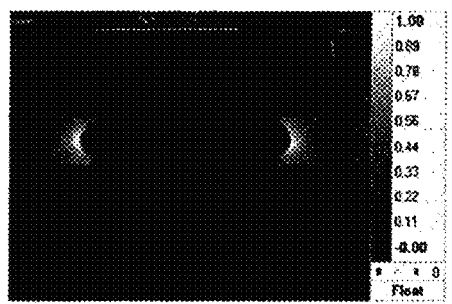
FIG. 6B is a normalized image after normalization when the excitation width to the target object is 0.75 mm.
Figure 6C:
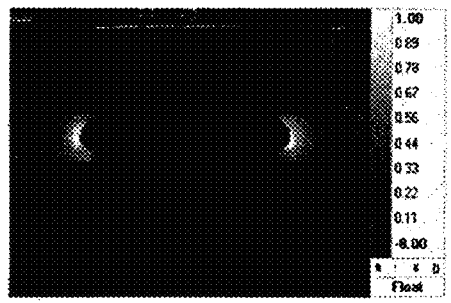
FIG. 6C is a normalized image after normalization when the excitation width to the target object is 1.25 mm.
Figure 6D:
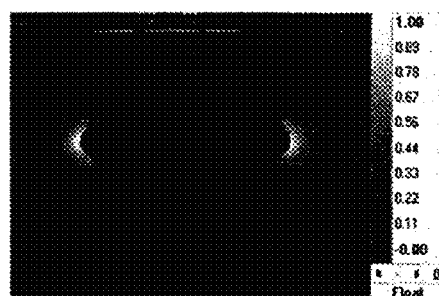
FIG. 6D is a normalized image after normalization when the excitation width to the target object is 1.50 mm.
Figure 6E:
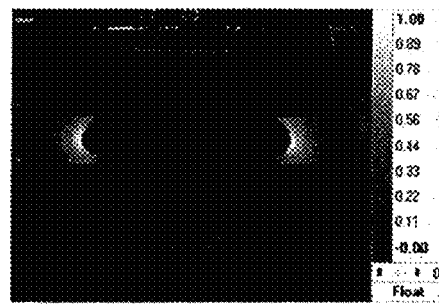
FIG. 6E is a normalized image after normalization when the excitation width to the target object is 1.75 mm.
Figure 6F:
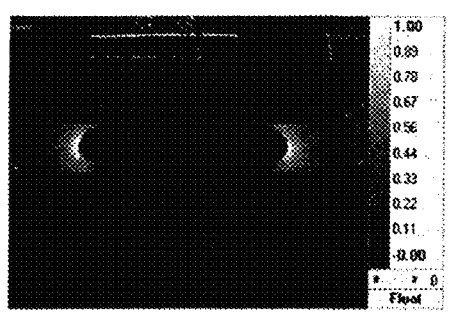
FIG. 6F is a normalized image after normalization when the excitation width to the target object is 2.00 mm.
Figure 6G:
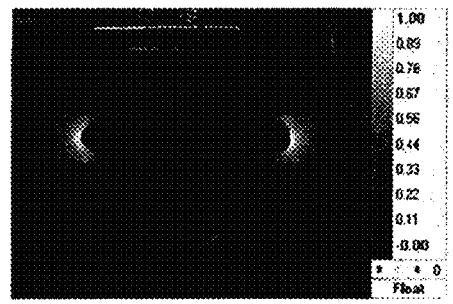
FIG. 6G is a normalized image after normalization when the excitation width to the target object is 2.25 mm.
Figure 6H:
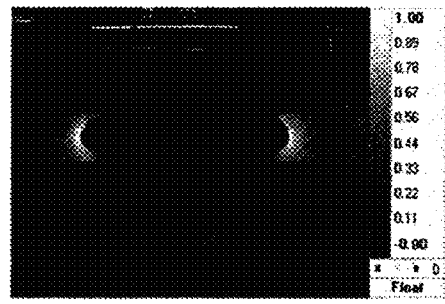
FIG. 6H is a normalized image after normalization when the excitation width to the target object is 2.50 mm.
Figure 6I:
FIG. 6I is a normalized image after normalization when the excitation width to the target object is 2.75 mm.
Figure 6J:
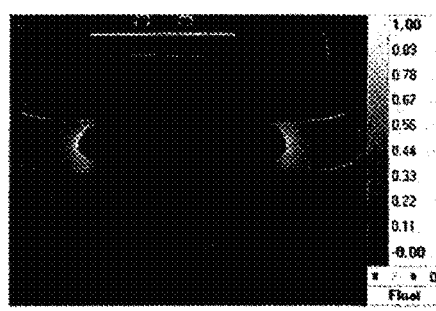
FIG. 6J is a normalized image after normalization when the excitation width to the target object is 3.00 mm.
Figure 7A:
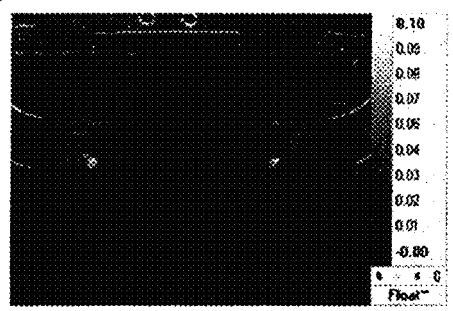
FIG. 7A is a diagram showing an image of a difference between a normalized image with an excitation width of 0.75 mm and a normalized image with an excitation width of 0.50 mm on a scale of 0 to 0.10.
Figure 7B:
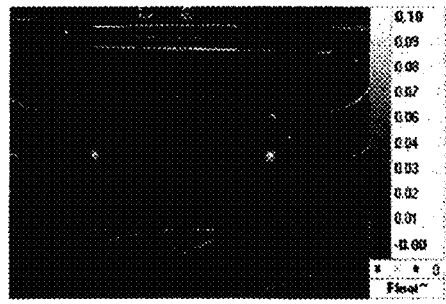
FIG. 7B is a diagram showing an image of a difference between a normalized image with an excitation width of 1.25 mm and a normalized image with an excitation width of 0.75 mm on a scale of 0 to 0.10.
Figure 7C:
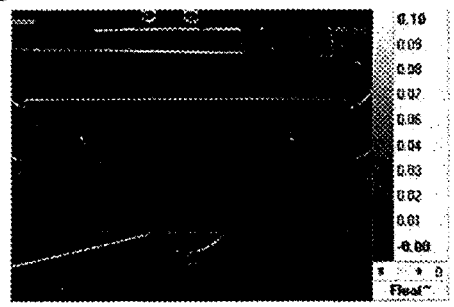
FIG. 7C is a diagram showing an image of a difference between a normalized image with an excitation width of 1.50 mm and a normalized image with an excitation width of 1.25 mm on a scale of 0 to 0.10.
Figure 7D:
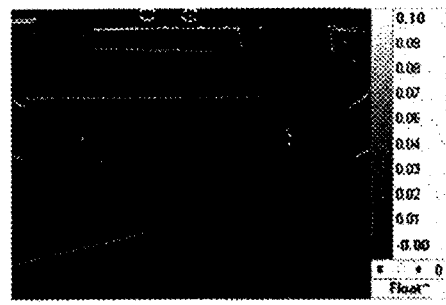
FIG. 7D is a diagram showing an image of a difference between a normalized image with an excitation width of 1.75 mm and a normalized image with an excitation width of 1.50 mm on a scale of 0 to 0.10.
Figure 7E:
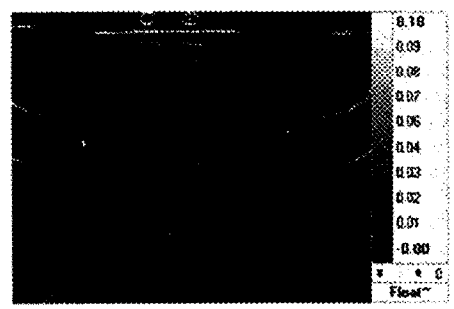
FIG. 7E is a diagram showing an image of a difference between a normalized image with an excitation width of 2.00 mm and a normalized image with an excitation width of 1.75 mm on a scale of 0 to 0.10.
Figure 7F:
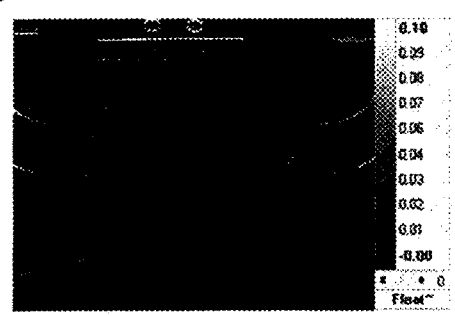
FIG. 7F is a diagram showing an image of a difference between a normalized image with an excitation width of 2.25 mm and a normalized image with an excitation width of 2.00 mm on a scale of 0 to 0.10.
Figure 7G:
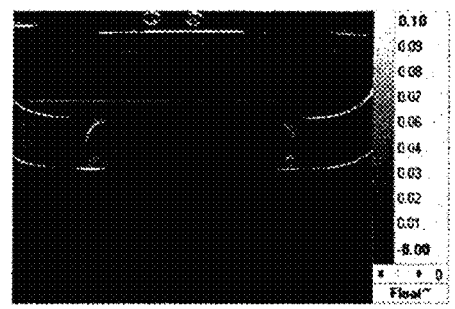
FIG. 7G is a diagram showing an image of a difference between a normalized image with an excitation width of 2.50 mm and a normalized image with an excitation width of 2.25 mm on a scale of 0 to 0.10.
Figure 7H:
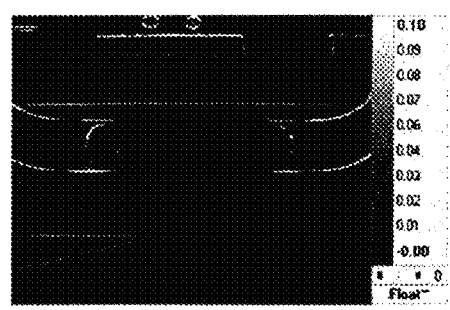
FIG. 7H is a diagram showing an image of a difference between a normalized image with an excitation width of 2.75 mm and a normalized image with an excitation width of 2.50 mm on a scale of 0 to 0.10.
Figure 7I:
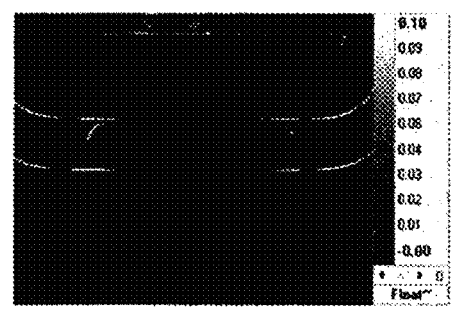
FIG. 7I is a diagram showing an image of a difference between a normalized image with an excitation width of 3.00 mm and a normalized image with an excitation width of 2.75 mm on a scale of 0 to 0.10.
Figure 8A:
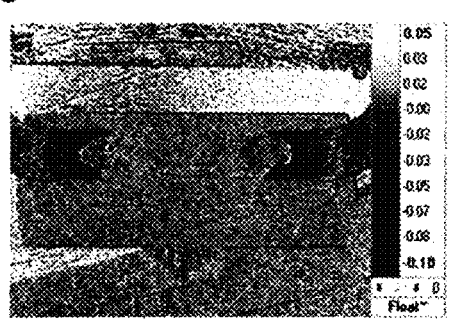
FIG. 8A is a diagram showing an image of a difference between a normalized image with an excitation width of 0.75 mm and a normalized image with an excitation width of 0.50 mm on a scale of −0.10 to 0.05.
Figure 8B:
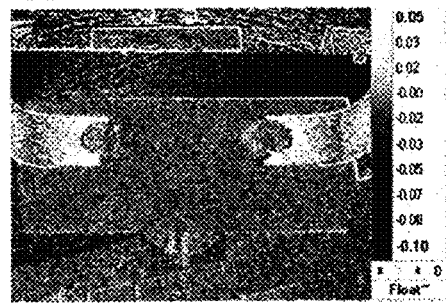
FIG. 8B is a diagram showing an image of a difference between a normalized image with an excitation width of 1.25 mm and a normalized image with an excitation width of 0.75 mm on a scale of −0.10 to 0.05.
Figure 8C:
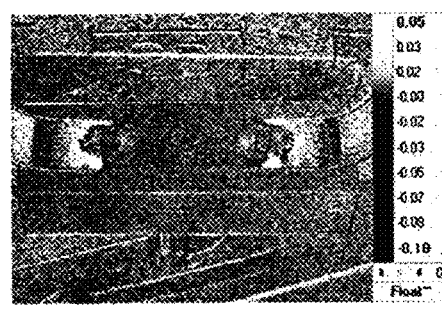
FIG. 8C is a diagram showing an image of a difference between a normalized image with an excitation width of 1.50 mm and a normalized image with an excitation width of 1.25 mm on a scale of −0.10 to 0.05.
Figure 8D:
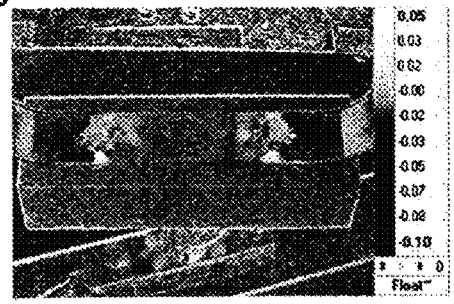
FIG. 8D is a diagram showing an image of a difference between a normalized image with an excitation width of 1.75 mm and a normalized image with an excitation width of 1.50 mm on a scale of −0.10 to 0.05.
Figure 8E:
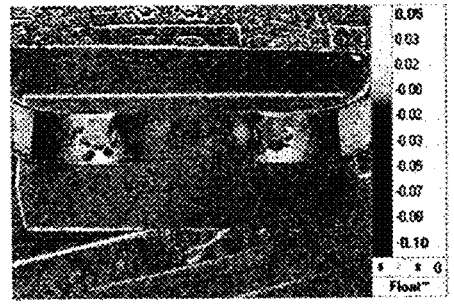
FIG. 8E is a diagram showing an image of a difference between a normalized image with an excitation width of 2.00 mm and a normalized image with an excitation width of 1.75 mm on a scale of −0.10 to 0.05.
Figure 8F:
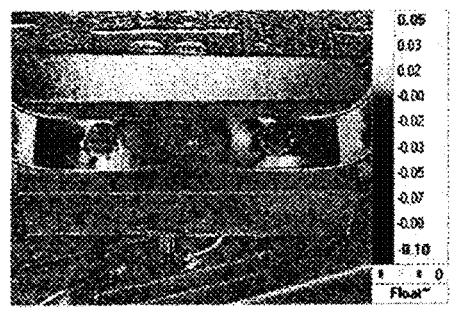
FIG. 8F is a diagram showing an image of a difference between a normalized image with an excitation width of 2.25 mm and a normalized image with an excitation width of 2.00 mm on a scale of −0.10 to 0.05.
Figure 8G:
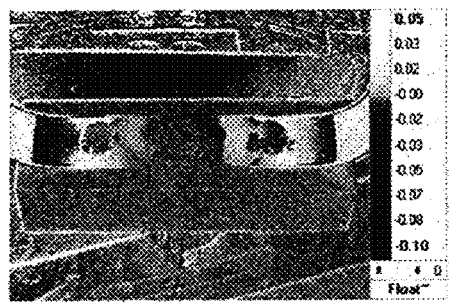
FIG. 8G is a diagram showing an image of a difference between a normalized image with an excitation width of 2.50 mm and a normalized image with an excitation width of 2.25 mm on a scale of −0.10 to 0.05.
Figure 8H:
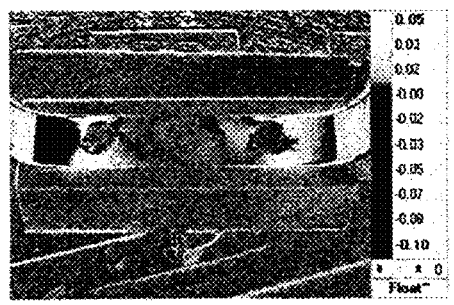
FIG. 8H is a diagram showing an image of a difference between a normalized image with an excitation width of 2.75 mm and a normalized image with an excitation width of 2.50 mm on a scale of −0.10 to 0.05.
Figure 8I:
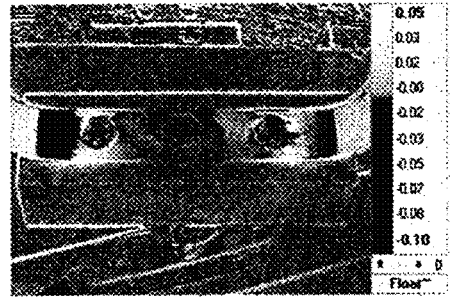
FIG. 8I is a diagram showing an image of a difference between a normalized image with an excitation width of 3.00 mm and a normalized image with an excitation width of 2.75 mm on a scale of −0.10 to 0.05.
Figure 9A:
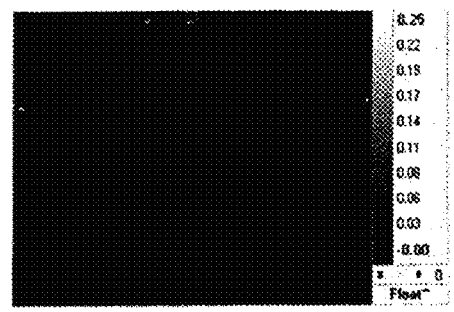
FIG. 9A is a diagram showing an image of a difference between a normalized image with an excitation width of 0.75 mm and a normalized image with an excitation width of 0.50 mm on a scale of 0 to 0.25.
Figure 9B:
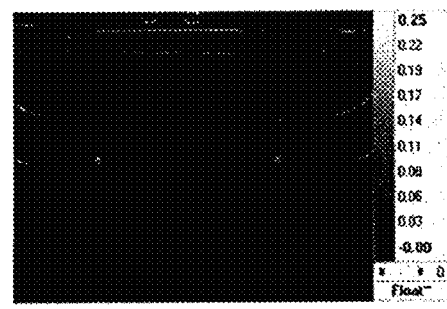
FIG. 9B is a diagram showing an image of a difference between a normalized image with an excitation width of 1.25 mm and a normalized image with an excitation width of 0.50 mm on a scale of 0 to 0.25.
Figure 9C:
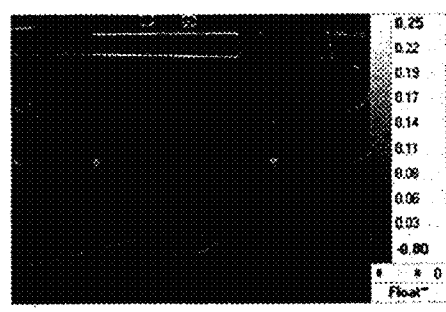
FIG. 9C is a diagram showing an image of a difference between a normalized image with an excitation width of 1.50 mm and a normalized image with an excitation width of 0.50 mm on a scale of 0 to 0.25.
Figure 9D:
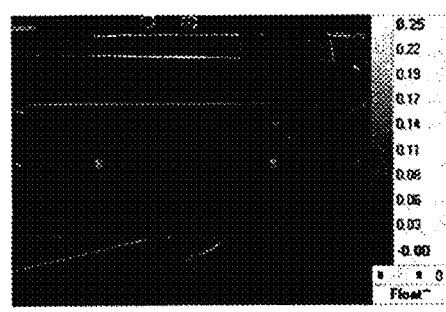
FIG. 9D is a diagram showing an image of a difference between a normalized image with an excitation width of 1.75 mm and a normalized image with an excitation width of 0.50 mm on a scale of 0 to 0.25.
Figure 9E:
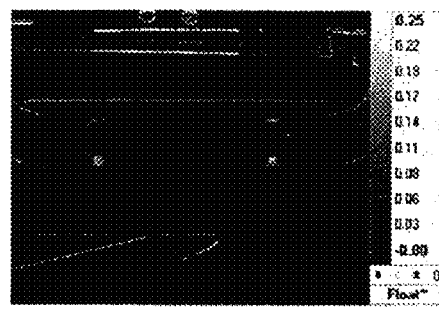
FIG. 9E is a diagram showing an image of a difference between a normalized image with an excitation width of 2.00 mm and a normalized image with an excitation width of 0.50 mm on a scale of 0 to 0.25.
Figure 9F:
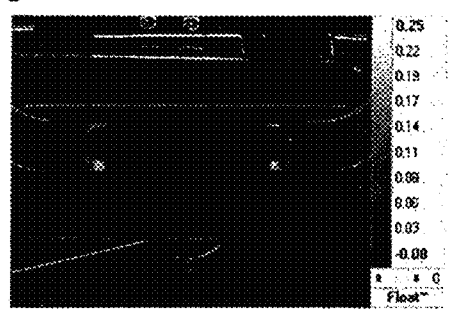
FIG. 9F is a diagram showing an image of a difference between a normalized image with an excitation width of 2.25 mm and a normalized image with an excitation width of 0.50 mm on a scale of 0 to 0.25.
Figure 9G:
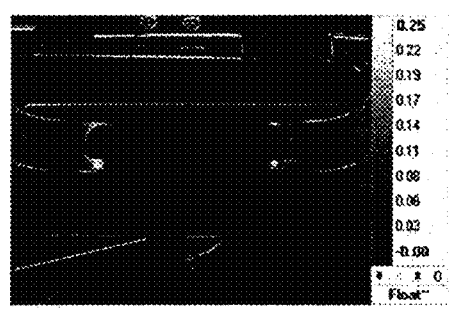
FIG. 9G is a diagram showing an image of a difference between a normalized image with an excitation width of 2.50 mm and a normalized image with an excitation width of 0.50 mm on a scale of 0 to 0.25.
Figure 9H:
FIG. 9H is a diagram showing an image of a difference between a normalized image with an excitation width of 2.75 mm and a normalized image with an excitation width of 0.50 mm on a scale of 0 to 0.25.
Figure 9I:
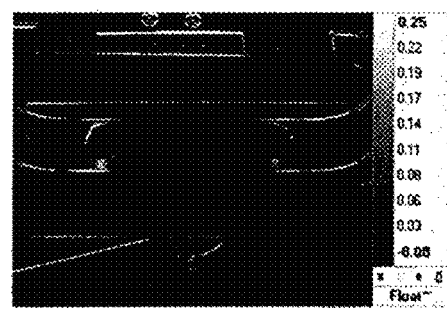
FIG. 9I is a diagram showing an image of a difference between a normalized image with an excitation width of 3.00 mm and a normalized image with an excitation width of 0.50 mm on a scale of 0 to 0.25.
Figure 10A:
FIG. 10A is a diagram showing an image of a difference between a normalized image with an excitation width of 0.75 mm and a normalized image with an excitation width of 0.50 mm on a scale of −0.10 to 0.25.
Figure 10B:
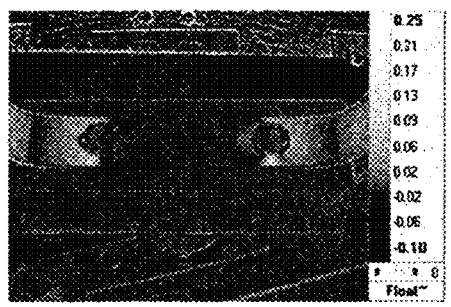
FIG. 10B is a diagram showing an image of a difference between a normalized image with an excitation width of 1.25 mm and a normalized image with an excitation width of 0.50 mm on a scale of −0.10 to 0.25.
Figure 10C:
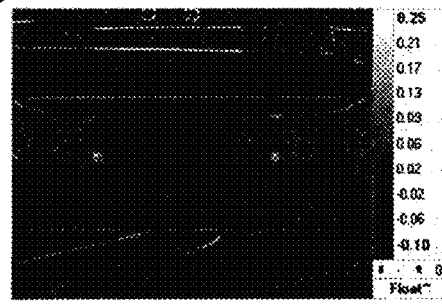
FIG. 10C is a diagram showing an image of a difference between a normalized image with an excitation width of 1.50 mm and a normalized image with an excitation width of 0.50 mm on a scale of −0.10 to 0.25.
Figure 10D:
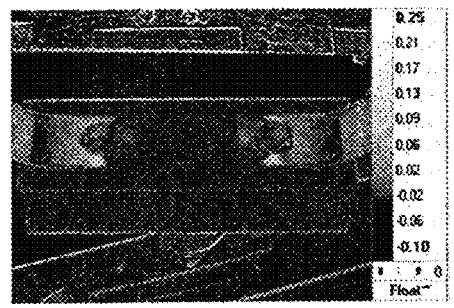
FIG. 10D is a diagram showing an image of a difference between a normalized image with an excitation width of 1.75 mm and a normalized image with an excitation width of 0.50 mm on a scale of −0.10 to 0.25.
Figure 10E:
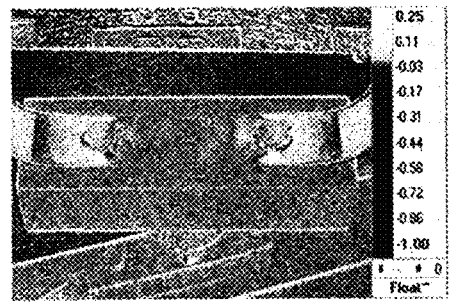
FIG. 10E is a diagram showing an image of a difference between a normalized image with an excitation width of 2.00 mm and a normalized image with an excitation width of 0.50 mm on a scale of −0.10 to 0.25.
Figure 10F:
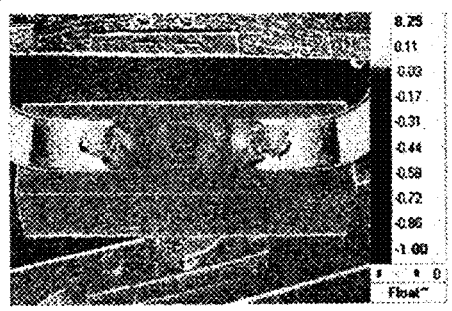
FIG. 10F is a diagram showing an image of a difference between a normalized image with an excitation width of 2.25 mm and a normalized image with an excitation width of 0.50 mm on a scale of −0.10 to 0.25.
Figure 10G:
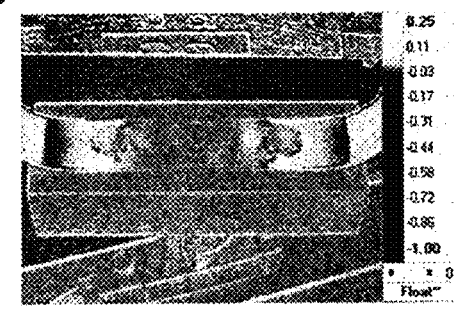
FIG. 10G is a diagram showing an image of a difference between a normalized image with an excitation width of 2.50 mm and a normalized image with an excitation width of 0.50 mm on a scale of −0.10 to 0.25.
Figure 10H:
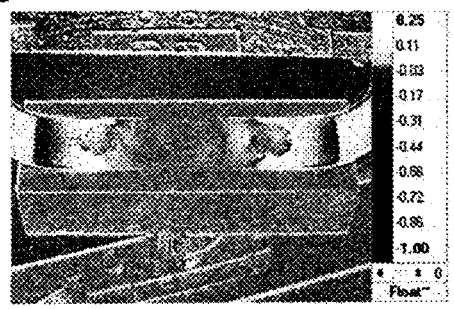
FIG. 10H is a diagram showing an image of a difference between a normalized image with an excitation width of 2.75 mm and a normalized image with an excitation width of 0.50 mm on a scale of −0.10 to 0.25.
Figure 10I:
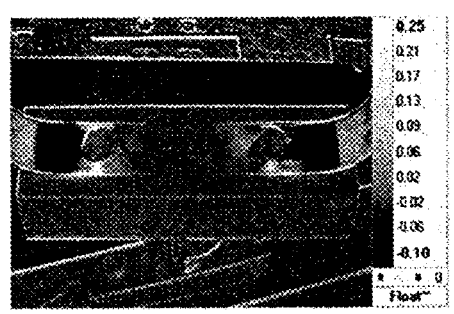
FIG. 10I is a diagram showing an image of a difference between a normalized image with an excitation width of 3.00 mm and a normalized image with an excitation width of 0.50 mm on a scale of −0.10 to 0.25.
Figure 11A:
FIG. 11A is a diagram showing an image obtained by dividing each pixel of a normalized image with an excitation width of 0.50 mm by each pixel of a normalized image with an excitation width of 2.00 mm on a scale of −3 to 3.
Figure 11B:
FIG. 11B is a diagram showing an image obtained by dividing each pixel of a normalized image with an excitation width of 0.75 mm by each pixel of a normalized image with an excitation width of 2.00 mm on a scale of −3 to 3.
Figure 11C:
FIG. 11C is a diagram showing an image obtained by dividing each pixel of a normalized image with an excitation width of 1.25 mm by each pixel of a normalized image with an excitation width of 2.00 mm on a scale of −3 to 3.
Figure 11D:
FIG. 11D is a diagram showing an image obtained by dividing each pixel of a normalized image with an excitation width of 1.50 mm by each pixel of a normalized image with an excitation width of 2.00 mm on a scale of −3 to 3.
Figure 11E:
FIG. 11E is a diagram showing an image obtained by dividing each pixel of a normalized image with an excitation width of 1.75 mm by each pixel of a normalized image with an excitation width of 2.00 mm on a scale of −3 to 3.
Figure 11F:
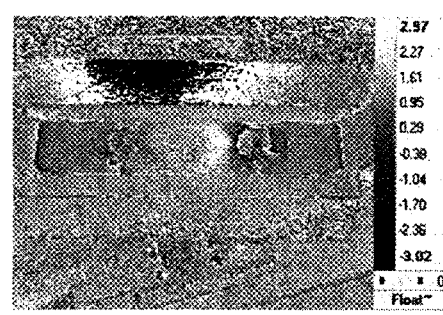
FIG. 11F is a diagram showing an image obtained by dividing each pixel of a normalized image with an excitation width of 2.25 mm by each pixel of a normalized image with an excitation width of 2.00 mm on a scale of −3 to 3.
Figure 11G:
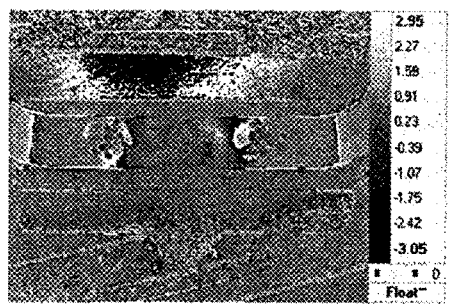
FIG. 11G is a diagram showing an image obtained by dividing each pixel of a normalized image with an excitation width of 2.50 mm by each pixel of a normalized image with an excitation width of 2.00 mm on a scale of −3 to 3.
Figure 11H:
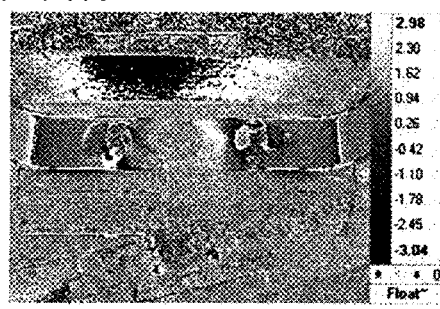
FIG. 11H is a diagram showing an image obtained by dividing each pixel of a normalized image with an excitation width of 2.75 mm by each pixel of a normalized image with an excitation width of 2.00 mm on a scale of −3 to 3.
Figure 11I:
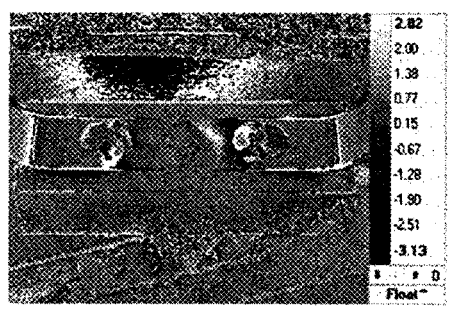
FIG. 11I is a diagram showing an image obtained by dividing each pixel of a normalized image with an excitation width of 3.00 mm by each pixel of a normalized image with an excitation width of 2.00 mm on a scale of −3 to 3.
Figure 12A:
FIG. 12A is a diagram showing an image in which each pixel of a normalized image with an excitation width of 0.50 mm is multiplied by each pixel of a normalized image with an excitation width of 2.00 mm on a scale of 0 to 0.50.
Figure 12B:
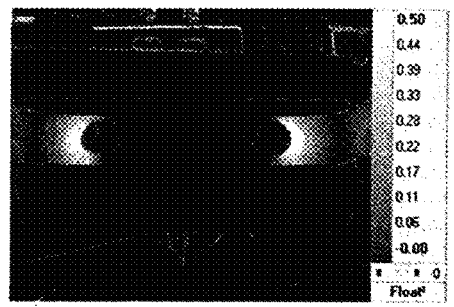
FIG. 12B is a diagram showing an image in which each pixel of a normalized image with an excitation width of 0.75 mm is multiplied by each pixel of a normalized image with an excitation width of 2.00 mm on a scale of 0 to 0.50.
Figure 12C:
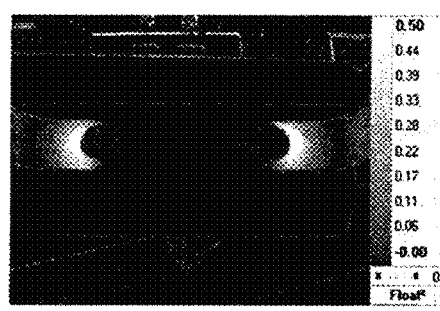
FIG. 12C is a diagram showing an image in which each pixel of a normalized image with an excitation width of 1.25 mm is multiplied by each pixel of a normalized image with an excitation width of 2.00 mm on a scale of 0 to 0.50.
Figure 12D:
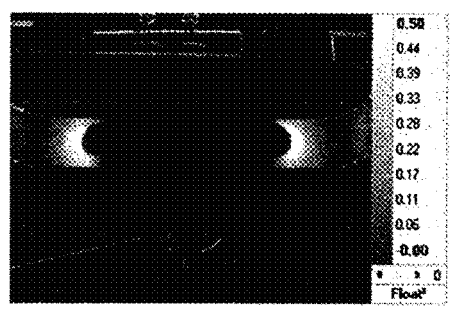
FIG. 12D is a diagram showing an image in which each pixel of a normalized image with an excitation width of 1.50 mm is multiplied by each pixel of a normalized image with an excitation width of 2.00 mm on a scale of 0 to 0.50.
Figure 12E:
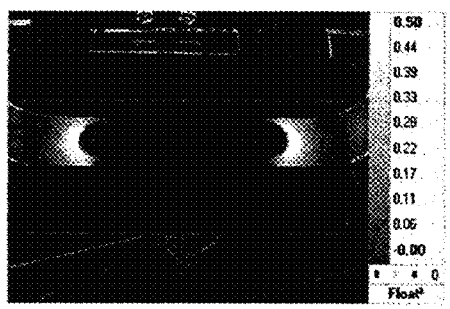
FIG. 12E is a diagram showing an image in which each pixel of a normalized image with an excitation width of 1.75 mm is multiplied by each pixel of a normalized image with an excitation width of 2.00 mm on a scale of 0 to 0.50.
Figure 12F:
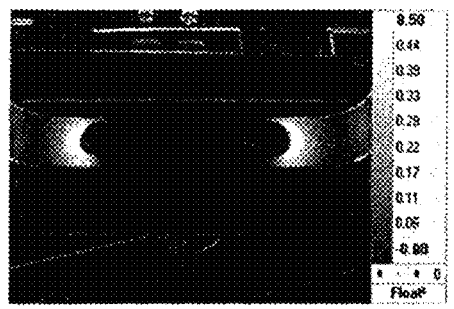
FIG. 12F is a diagram showing an image in which each pixel of a normalized image with an excitation width of 2.25 mm is multiplied by each pixel of a normalized image with an excitation width of 2.00 mm on a scale of 0 to 0.50.
Figure 12G:
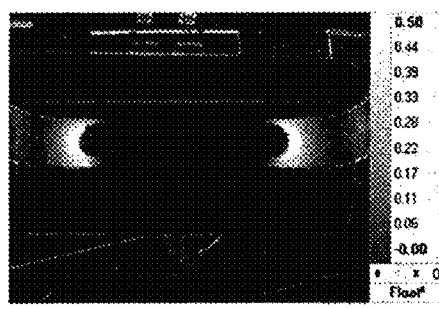
FIG. 12G is a diagram showing an image in which each pixel of a normalized image with an excitation width of 2.50 mm is multiplied by each pixel of a normalized image with an excitation width of 2.00 mm on a scale of 0 to 0.50.
Figure 12H:
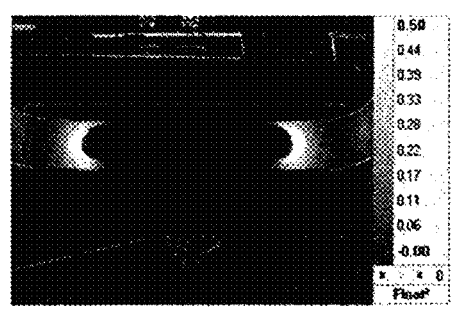
FIG. 12H is a diagram showing an image in which each pixel of a normalized image with an excitation width of 2.75 mm is multiplied by each pixel of a normalized image with an excitation width of 2.00 mm on a scale of 0 to 0.50.
Figure 12I:
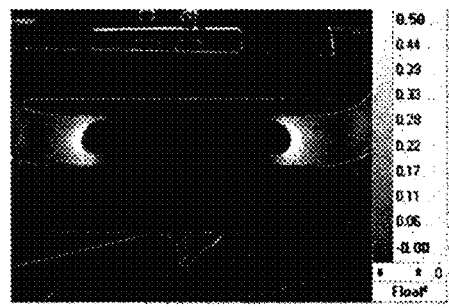
FIG. 12I is a diagram showing an image in which each pixel of a normalized image with an excitation width of 3.00 mm is multiplied by each pixel of a normalized image with an excitation width of 2.00 mm on a scale of 0 to 0.50.

Specifically, when a stress value before normalization is denoted as X, an average thereof is denoted as p, a standard deviation thereof is denoted as a, and a value after normalization is denoted as Y, normalization can be performed by the following formula.

$$Y=(X-\mu)/\sigma$$

c) A normalization method in which 0 base (a point that does not change is set to 0) or no load is set to 0. In each stress distribution image, a point that does not change is set to 0. Specifically, normalization can be performed similarly to the above a), with the region average value of the region 8b having a small stress value as the minimum value 0 and the region average value of the region 8a having a large stress value as the maximum value 1 in each stress distribution image.

d) A normalization method with a minimum value of a small load as the base. Specifically, of the stress distribution images before normalization in FIGS. 5A to 5J, the minimum stress value in the region having a small stress value in the stress distribution image in FIG. 5A having the smallest excitation condition is set to 0, and the maximum stress value in the region 8a having a large stress value in each stress distribution image is set to 1, and normalization can be performed similarly to the above a).

e) Normalization method by root mean square 1. Specifically, using the calculated root mean square y, the stress value X before normalization can be normalized to the value Y after normalization by Y=X/y.

f) A normalization method that follows a Gaussian distribution. Specifically, normalization can be performed so that an average value and a standard deviation are obtained from each stress distribution image, a probability density function of all pixels is calculated to prepare a probability distribution, and a maximum value and a minimum value of the obtained probability distribution are rearranged to 1 and 0, respectively.

<Entire Screen Expansion Unit>

The processing unit 31 is configured to perform normalization over the entire screen of the stress distribution image based on the normalization method in the normalization region to obtain a normalized image of the entire screen to function as an entire screen expansion unit 35d. In this case, in the entire screen, the normalized maximum value corresponding to the maximum value in the normalization region is also assigned to all the pixels exceeding the maximum value of the stress in the designated normalization region. Similarly, in the entire screen, the normalized minimum value corresponding to the minimum value in the normalization region is assigned also to all the pixels below the minimum value of the stress in the designated normalization region. Thus, performing the normalization in the normalization region being a part of the entire screen, and then expanding the normalization to the entire screen allows also the high-luminance noise included in the case of the entire screen to be suppressed within the range in the normalization.

<Four Arithmetic Operation Unit>

FIGS. 5A to 5J are stress distribution images before normalization with various excitation widths to the target object. FIGS. 6A to 6J are normalized images after normalization of the stress distribution images in FIGS. 5A to 5J. FIGS. 7A to 7I are diagrams showing, on a scale of 0 to 0.10, images of differences between two adjacent normalized images in FIGS. 6A to 6J. FIGS. 8A to 8I are diagrams showing, on a scale of −0.10 to 0.05, images of differences between two adjacent normalized images in FIGS. 6A to 6J. FIGS. 9A to 9I are diagrams showing, on a scale of 0 to 0.25, images of differences between normalized images in FIGS. 6B to 6J and a normalized image in FIG. 6A. FIGS. 10A to 10I are diagrams showing, on a scale of −0.10 to 0.25, images of differences between normalized images in FIGS. 6B to 6J and a normalized image in FIG. 6A. FIGS. 11A to 11I are diagrams showing, on a scale of −3 to 3, images obtained by dividing each pixel of the normalized images in FIGS. 6A to 6E and FIGS. 6G to 6J by each pixel of the normalized image in FIG. 6F. FIGS. 11A to 11I are diagrams showing, on a scale of 0 to 0.50, images obtained by multiplying each pixel of the normalized images in FIGS. 6A to 6E and FIGS. 6G to 6J by each pixel of the normalized image in FIG. 6F.

With respect to the plurality of normalized images, the processing unit 31 is configured to perform at least one of four arithmetic operations, that is, addition, subtraction, multiplication, and division on all pixels between the respective normalized images to obtain a four arithmetic operation processed image to function as a four arithmetic operation unit 35e. It is possible to extract various feature amounts by obtaining a four arithmetic operation processed image obtained by performing four arithmetic operations on normalized images different in excitation conditions to the target object. Thus, it is possible to use the feature amount as the extracted supervised data when performing the mechanization learning.

i) Subtraction (Difference)

The difference can be seen by difference between normalized images of adjacent excitation conditions, that is, subtraction. In this case, when a case in which the scale of the image of the difference is 0 to 0.10 (FIGS. 7A to 7I) and a case in which the scale is −0.10 to 0.05 (FIGS. 8A to 8I) are compared with each other, it can be seen that the feature portion that can be extracted changes depending on whether or not 0 is sandwiched in the scale.

In addition, in the images (FIGS. 9A to 9I and FIGS. 10A to 10I) of the difference between the normalized image in each excitation condition and the normalized image in the minimum excitation condition, the difference from the normalized image in the minimum excitation condition is clear.

ii) Addition

When the direction of change of the stress is different in a case where the excitation condition is different, performing addition of each normalized image having a scale sandwiching 0 leads to be canceled out to be 0. That is, detecting a portion that becomes 0 by addition makes it possible to find a portion where the direction of the stress change is opposite, for example.

iii) Multiplication

In the images obtained by multiplying the normalized image in each excitation condition by the normalized image in the intermediate excitation condition (FIGS. 12A to 12I), a singular point is emphasized.

iv) Division

In the images obtained by dividing the normalized image in each excitation condition by the normalized image in the intermediate excitation condition (FIGS. 11A to 11I), a characteristic close to subtraction is extracted.

<Abnormality Detection Unit>

The processing unit 31 is configured to detect an abnormality of the target object based on the obtained four arithmetic operation processed images to function as an abnormality detection unit 35f. In the range of elastic deformation, the target object returns to the original state even when deformed by excitation. On the other hand, in the case of being deformed by receiving excessive stress exceeding the range of elastic deformation, the target object undergoes plastic deformation. For example, the portion of plastic deformation due to excessive stress can be detected by images of difference between adjacent excitation conditions (FIGS. 7A to 7I and FIGS. 8A to 8I), images of difference between the normalized image in each excitation condition and the normalized image in the minimum excitation condition (FIGS. 9A to 9I and FIGS. 10A to 10I), or the like.

In addition, difference similar to that in the subtraction may be detected in the images of division (FIGS. 11A to 11I). Furthermore, singular points may be detected in the images of multiplication (FIGS. 12A to 12I).

<Display Unit>

The display unit 33 may display the captured infrared image, the obtained stress distribution image, the normalized image, the four arithmetic operation processed image, and the like.

<Infrared Camera>

When an infrared image of the target object 1 is captured and a stress distribution image is obtained from the infrared image, an infrared camera 20 may be used. When a stress distribution image has already been obtained, there is no need to provide an infrared camera. The infrared camera 20 has a plurality of pixels, for example, 320×256 pixels, and captures an infrared image of the target object 1. It should be noted that the above characteristics of the infrared camera are examples, and are not limited thereto.

It should be noted that at least one infrared camera 20 has only to be provided. Two or more infrared images may be used in order to capture infrared images over the entire field of view, but in this case, it is desirable to perform alignment on the infrared images captured by the respective infrared cameras.

<Stress Distribution Image Processing Method>

Figure 4:
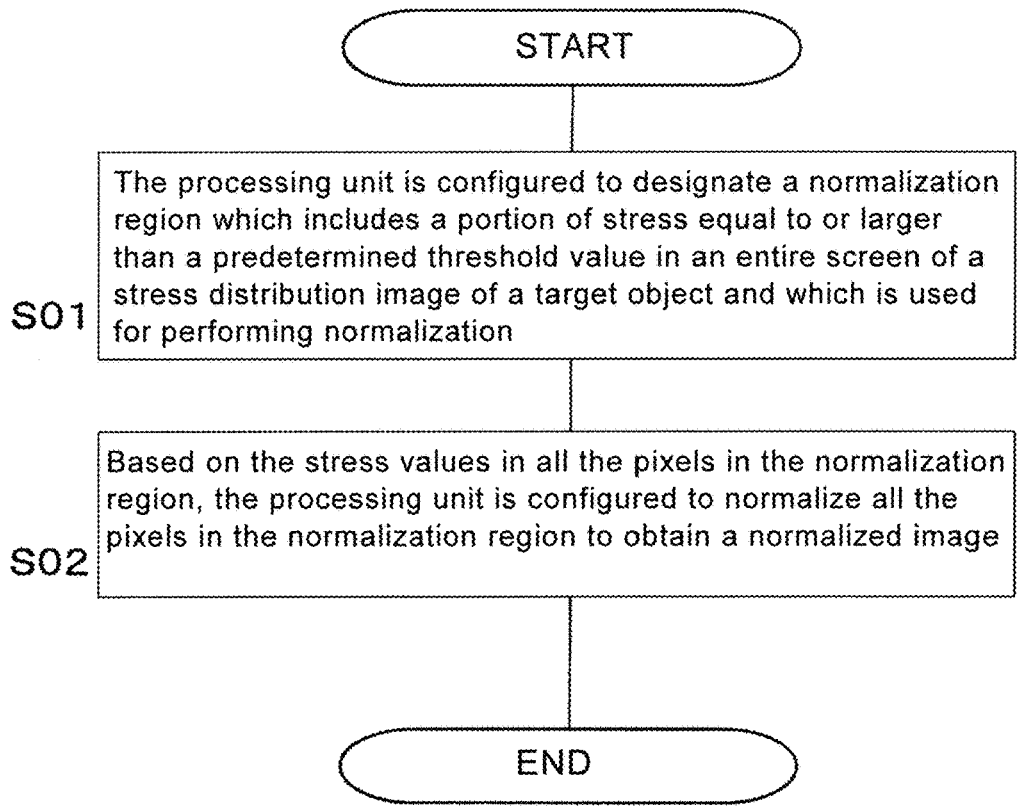
FIG. 4 is a flowchart of a stress distribution image processing method according to the first preferred embodiment.

FIG. 4 is a flowchart of the stress distribution image processing method according to the first preferred embodiment.

1) The processing unit is configured to designate a normalization region which includes a portion of stress equal to or larger than a predetermined threshold value in an entire screen of a stress distribution image of a target object and which is used for performing normalization (S01).

2) Based on the stress values in all the pixels in the normalization region, the processing unit is configured to normalize all the pixels in the normalization region to obtain a normalized image (S02).

According to this stress distribution image processing method, a region including a portion of stress equal to or larger than a predetermined threshold value is designated as a normalization region, and normalization is performed. Therefore, a normalized image that can be compared even under different conditions can be provided.

In addition, in the region designation step (S01), a rectangular range including a portion of stress equal to or larger than a predetermined threshold value may be set as the normalization region.

Furthermore, the stress distribution image processing method may include an entire screen expansion step of performing normalization over the entire screen of the stress distribution image based on the normalization method in the normalization region to obtain a normalized image.

Furthermore, with respect to a plurality of normalized images corresponding to a plurality of different conditions for the same target object, the stress distribution image processing method may include a four arithmetic operation step of performing at least one of the four arithmetic operations on all the pixels in the normalization region between the respective normalized images to obtain a four arithmetic operation processed image.

In addition, the stress distribution image processing method may include an abnormality detection step of detecting an abnormality of the target object based on the four arithmetic operation processed image.

The stress distribution image processing device and the stress distribution image processing method can handle an image if it is a stress distribution image related to a target object to which stress is applied.

The target object may be, for example, a bridge, a heavy machine, a vehicle, a platform truck, or the like.

It should be noted that the present disclosure includes appropriate combination of any embodiments and/or examples among the various embodiments and/or examples described above, and effects of the respective embodiments and/or examples can be exhibited.

According to the stress distribution image processing device of the present invention, since a normalized image can be obtained by designating a region including a portion of stress equal to or larger than the predetermined threshold value as the normalization region and performing the normalization, it is possible to provide a normalized image that can be compared even under different conditions.

Therefore, stress distribution images under various conditions can be compared.

What is claimed is:

1. A stress distribution image processing device comprising:
    a memory storing a program; and
    a processing unit,
    wherein the program, when executed by the processing unit, causes the processing unit to:
        designate a normalization region which includes a portion of stress equal to or larger than a predetermined threshold value in a screen of a stress distribution image of a target object; and
        obtain a normalized image of stress distribution by normalizing pixels in the normalization region based on stress values in the normalization region, by utilizing a normalization method using a maximum stress value and a minimum stress value of the pixels in the normalization region.

2. The stress distribution image processing device according to claim 1, wherein the program causes the processing unit to normalize all pixels in the normalization region to obtain the normalized image.

3. The stress distribution image processing device according to claim 1, wherein the program causes the processing unit to set a rectangular range including a portion of stress equal to or larger than the predetermined threshold value as a normalization region.

4. The stress distribution image processing device according to claim 2, wherein in the normalization method, the maximum value and the minimum value of the stress values in all pixels in the normalization region are set to 1 and 0, respectively.

5. The stress distribution image processing device according to claim 2, wherein the program causes the processing unit to perform normalization over an entire screen of the stress distribution image based on a normalization method in the normalization region to obtain a normalized image to function as an entire screen expansion unit.

6. The stress distribution image processing device according to claim 2, wherein the program causes the processing unit to perform, with respect to a plurality of normalized images corresponding to a plurality of different conditions for an identical target object, at least one of four arithmetic operations on all pixels in the normalization region between the respective normalized images to obtain a four arithmetic operation processed image to function as a four arithmetic operation unit.

7. The stress distribution image processing device according to claim 6, wherein the program causes the processing unit to detect an abnormality of the target object based on the four arithmetic operation processed image to function as an abnormality detection unit.

8. The stress distribution image processing device according to claim 1, wherein the normalizing in the normalization region is applied to the entire stress distribution image, and values exceeding the maximum and minimum values of the normalization region in the entire stress distribution image are rounded and the maximum and minimum values after normalization assigned to the values that exceed the maximum and minimum values of the normalized region.

9. The stress distribution image processing device according to claim 1, wherein the processing unit includes at least one of a CPU, an MPU, or a microcomputer.

10. A stress distribution image processing device comprising:
    a memory storing a program; and
    a processing unit,
    wherein the program, when executed by the processing unit, causes the processing unit to:
        designate a normalization region which includes a portion of stress equal to or larger than a predetermined threshold value in a screen of a stress distribution image of a target object; and
        obtain a normalized image of stress distribution by normalizing all pixels in the normalization region based on stress values in the normalization region, and
        in the normalization method, of all pixels in the normalization region, an average is set to 0 and a variance is set to 1.

11. A stress distribution image processing device comprising:
    a memory storing a program; and
    a processing unit,
    wherein the program, when executed by the processing unit, causes the processing unit to:
        designate a normalization region which includes a portion of stress equal to or larger than a predetermined threshold value in a screen of a stress distribution image of a target object; and
        obtain a normalized image of stress distribution by normalizing all pixels in the normalization region based on stress values in the normalization region, and
        the program causes the processing unit to perform, with respect to a plurality of normalized images corresponding to a plurality of different conditions for an identical target object, at least one of four arithmetic operations on all pixels in the normalization region between the respective normalized images to obtain a four arithmetic operation processed image to function as a four arithmetic operation unit.

12. The stress distribution image processing device according to claim 11, wherein the program causes the processing unit to detect an abnormality of the target object based on the four arithmetic operation processed image to function as an abnormality detection unit.

\* \* \* \* \*